United States Patent [19]

Freeman

[11] 3,890,957

[45] June 24, 1975

[54] BIOLOGICAL FEEDBACK SYSTEMS

[75] Inventor: James A. Freeman, Berkeley, Calif.

[73] Assignee: FSW Associates, Calif.

[22] Filed: Aug. 2, 1974

[21] Appl. No.: 494,288

Related U.S. Application Data

[63] Continuation of Ser. No. 299,774, Oct. 24, 1972, abandoned.

[52] U.S. Cl................................................. 128/2.1 B
[51] Int. Cl.............................................. A61b 5/04
[58] Field of Search ...... 128/2.05 P, 2.05 R, 2.05 S, 128/2.05 T, 2.06 A, 2.06 F, 2.06 R, 2.1 B, 2.1 R

[56] References Cited
UNITED STATES PATENTS

| | | | |
|---|---|---|---|
| 3,413,546 | 11/1968 | Riehl et al. | 128/2.1 B |
| 3,587,563 | 6/1971 | Ragsdale | 128/2.06 A |
| 3,732,868 | 5/1973 | Willems et al. | 128/2.06 A |
| 3,760,796 | 9/1973 | Baessler et al. | 128/2.1 B |

FOREIGN PATENTS OR APPLICATIONS 1,192,612  5/1970  United Kingdom............. 128/2.1 B

*Primary Examiner*—William E. Kamm
*Attorney, Agent, or Firm*—Flehr, Hohbach, Test, Albritton & Herbert

[57] ABSTRACT

A biological feedback system which is particularly useful for the processing of EEG (electroencephalogram) signals. In such use the present system receives a signal from a subject organism and generates an electrical signal in response thereto. Provision is made for detecting the dominant periodicity of this electrical signal, preferably as the time average of zero crossings of the signal about its own average value. A first analog signal is developed having a DC magnitude which is proportional to the frequency of the periodicity. A hybrid filter is used to develop the first signal by analog to digital conversion, counting and averaging the zero crossings and reconverting the average count in analog form. A second analog signal is developed, the DC magnitude of which is proportional to the strength of the signal received from the subject. These first and second analog signals are used to control the output of various indicators having signals which are perceptible to the subject to thereby complete a feedback loop. In a preferred form of the invention these analog signals are used to control the output of a noise source so as to vary the spectral content of the noise source between high and low values in response to a change of the frequency of the signal from the subject. The range of emissions from the noise source is selected to be audible to the subject when converted to sound waves. The strength of the noise emission is controlled by the strength of the second analog signal and is accordingly proportional to the strength of the signal received.

12 Claims, 2 Drawing Figures

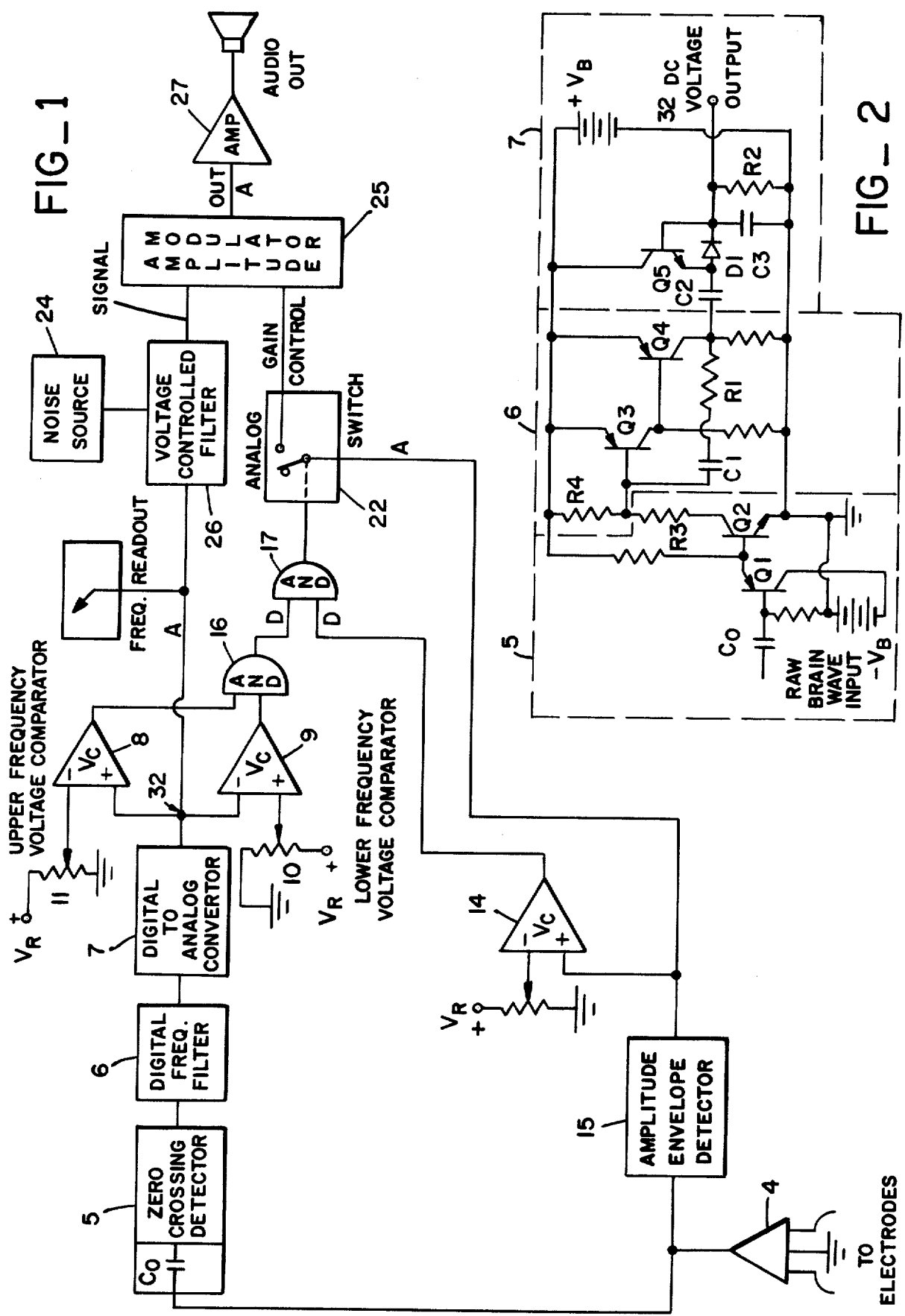

ns have poor frequency discrimination as the result of too few filtering stages or exhibit more accurate frequency discrimination but poor transient response, ringing, and overload when sufficient filtering is used to provide adequately accurate frequency information.

BIOLOGICAL FEEDBACK SYSTEMS

This is a continuation, of application Ser. No. 299,774 filed Oct. 24, 1972 now abandoned.

BACKGROUND OF THE INVENTION

This invention relates to biological feedback systems in which a signal is received from subject organism and the properties of the signal measured and transmitted into a form which can be returned to the subject so as to create a feedback loop of the subject's own biological function.

At the present time considerable research is underway concerning biological feedback of the so-called brainwave signals particularly in studies of human awareness. The present invention has been developed with particular reference to its use for the biological feedback of such brainwave signals, more technically known as EEG (electroencephalogram) signals. Accordingly, the following description will be given with particular reference to such an application, but as will become apparent, the various aspects of this invention taken either separately or together will be found to be useful in various other biological feedback systems. Accordingly, the following discussion should be taken in a specific sense in that it describes a specific system for use with EEG, and in a broader sense to the extent that it describes systems generally applicable to biological feedback.

Referring then more specifically to biological feedback of EEG signals, the brain, particularly of a human, is known to generate a continuous flow of electrical signals which offer an objective measurement of the nature of activity of the brain and central nervous system. Such signals have been studied and classified and are found to be generally nonperiodic, complex and of low frequency, largely in the range of 3 to 30 Hz. In general, researchers have broken the frequency content of human EEG signals into four major frequency bands: beta (greater than 13Hz), alpha (8–13 Hz), theta (4–8 Hz) and delta (0.5–4 Hz).

As it is now widely known, desirable states of body and mind are associated with certain brainwave frequency and amplitude parameters.

The human brain produces four major types of electrical rhythms, classified according to their frequency or number of waves per second. Beta waves, low voltage fast frequency waves, above 13 Hz, have been associated with and apparently result from an alert focused mental state characterized by concentration, tension, visual scanning, directed thinking, and/or anxiety. The alpha wave is of low frequency, between 8-13 Hz, and has been associated with and apparently results from an inwardly alert, non-drowsy state devoid of concrete visual imagery. Alpha waves have also been associated with tranquil, calm states of scanning or meditation. Theta waves, even slower than an alpha rhythm, betwen 4–8 Hz, are associated and result from several behavioral functions: namely drowsiness, dreaming, hypnogogic reverie, and problem solving, particularly the assimilation of new information.

Typically the interpretation of these various bands is accomplished by utilizing a data analysis system which attempts to give a quantitative measure of the amount of EEG energy contained in one or more of these bands as well as some measure of its location or frequency content within the band. Typically, known bio-feedback systems utilize some sort of analog filtering for resolving the frequency content of the EEG signal into the bands mentioned. Such analog filtering systems for resolving the EEG signal either have poor frequency discrimination as the result of too few filtering stages or exhibit more accurate frequency discrimination but poor transient response, ringing, and overload when sufficient filtering is used to provide adequately accurate frequency information.

At present the most widely used method of feedback is an audio tone signal, which may be a simple on/off device to indicate presence or absence of a given signal or may be modulated in various ways. Subjectively, these tone feedback signals are respectively either too monotonous or too distracting.

The modulated tone warble shifts rapidly in pitch and/or amplitude, following the EEG wave form. But a subject producing alpha cannot discriminate between 8 or 9 warbles per second, or even between 8 and 12. To do so requires focused atention (not conducive to alpha) and is, at best, vague and ambiguous.

In contrast, constant level tone feedback fails to provide discrimination between frequencies within a range, but at least it doesn't disturb and distract the subject with "information" that's all but impossible to interpret.

SUMMARY OF THE INVENTION AND OBJECTS

In general it is an object of the present invention to provide a biological feedback system which will overcome the above limitations and disadvantages.

It is a further object of the invention to provide a biological feedback system of the above character which is compact, reliable, low in cost, and which simultaneously is able to achieve a precise measure of the activity within the frequency bands of interest.

It is the further object of the invention to provide a bio-feedback system which enables the user to easily perceive a varying sound or other representation of the electrical activity of his own system and thereby voluntarily alter and control that activity.

It is a further object of the invention to provide a pleasant and effective, yet non-distracting audio feedback signal which indicates to the subject both the existence of brain waves within a desired amplitude and frequency limitations but also varies the amplitude and frequency range of such audio feedback to yield precise information about the amount of such activity and its location within the spectrum.

It is a further object of the invention to utilize pleasant noise signals for such audio feedback.

The present invention provides a biological system which, as applied to EEG, detects the electrical activity of the brain of the user and produces a sound audible to the user, which indicate the presence of selectible brainwave frequency and amplitude ranges. As a result, the user is able to continuously correlate (both consciously and subliminally) shifts in the frequency and amplitude of his EEG with discernable mental and physiological states.

The amplitude threshold control of this invention allows a subject to accurately control the minimum brainwave amplitude required to initiate feedback: while upper and lower frequency bandpass controls are provided to allow the subject to select the frequency range of his brainwaves required to initiate feedback.

If the brainwaves are within the parameters set by the frequency spectrum controls and the amplitude threshold control, a pleasant, non-distracting broadband energy audio feedback is initated.

The sound is preferably a broad band noise with spectrum modulation, i.e., treble to bass shifts a following frequency and further with loudness variation as the brainwaves vary in amplitude. The spectral content of the sound changes from the treble towards the bass regions as the brainwave frequency lowers, thus providing an accurate easily interpreted analog of small incremental changes in the EEG frequency and amplitude. The user is therefore, capable of rapidly developing an ongoing awareness and a means of modifying his brain electrical activity and to voluntarily enter into subjective moods associated with the specified brainwave frequency and amplitude parameters.

Most specifically, the foregoing objects and features are achieved in accordance with the present invention by providing a biological feedback system utilizing a hybrid or combination of analog and digital approaches in which the signal from the subject is sent through two channels. In one the signal is converted into digital form. In this form the dominant periodicity of the signal is detected as the time averaged zero crossings thereof taken from the average reference level of the signal. When appropriately compensated, the time average zero crossings are directly proportional to the frequency of the signal. The signal is then reconverted to an analog signal the DC magnitude of which is proportional to the frequency of the initial signal, i.e., to the periodicity indicated by the zero crossings of the signal.

The second channel produces a second analog signal which measures the average strength of the incoming or input biological signal.

A noise source is preferably used as the feedback signal. the The is generated over a frequency range which when converted to sound waves will become audible to the subject. The first analog signal is used for varying the spectral or frequency content of the noise from a higher to a lower range as the DC magnitude of the first analog signal varies between high and low values and the strength of the or amplitude of the noise signal is varied in response to the strength of the second analog signal.

These and other objects of the invention will become apparent from the following detailed description when taken in conjunction with the accompanying drawings.

BRIEF DESCRIPTION OF THE DRAWINGS

FIG. 1 is a schematic diagram of a biological feedback system constructed in accordance with the present invention.

FIG. 2 is a detailed circuit diagram of the hybrid spectrum analyzer portion of the biological feedback system of FIG. 1.

DETAILED DESCRIPTION OF THE PREFERRED EMBODIMENTS

Referring now to the FIGS., the signal which is to be processed is received from the subject through suitable pickup electrodes. Such electrodes are commonly available as used in typical EEG or EKG apparatus and can be connected to the scalp through a suitable conductive cream or paste or by other means which will assure adequate electrical contact.

The output of the amplifier 4 is taken through two separate channels, the first of which serves to detect the dominant frequency of the electrical signal as a time average of zero crossings of the signal about its own average level while the second measures the amplitude of the envelope of the signal and therefore supplies an indication of the strength of the signal present.

Thus, considering the first channel, the signal is applied to the input of a zero crossing detector 5 the output of which consists of a plurality of pulses indicating each time the signal crosses the zero of its average level. The output of the zero crossing detector drives a digital frequency filter 6 and processes the raw output of the zero crossing detector by filtering out the higher frequency components and erroneous multiple zero crossings.

In the presence of a complex wave form containing noise and many frequencies, a conventional zero crossing detector will indicate a zero crossing for each traverse of the signal across its reference level. This will result in a large number of multiple zero crossings which occur in rapid succession and which contain erroneous information with respect to the dominant frequency of interest. To avoid this, the frequency filter of the present invention provides a delay which requires a minimum set time between the passage of successive zero crossing indications before they are individually recognized, as will be explained.

The output of the digital frequency filter drives a digital-to-analog converter 7 which converts the input pulses into a voltage linearly proportional to the number of zero crossings per unit time and thus the input frequency. The output of the zero crossing detector is a digital pulse train which contains the dominant brainwave frequency information obscured by many erroneous pulses caused by noise and subdominant frequencies superimposed on the dominant frequency. Thus, as the dominant waveform approaches its zero voltage axis and the superimposed noise and subordinate frequency cause the waveform to cross its zero apex several times in a short duration. However, for dominant analysis purposes only one indication should prevail. The present invention provides a novel system for discriminating out the correct pulse while rejecting the erroneous ones and thus determining the dominant frequency.

Since the erroneous pulses appear in clusters in close proximity to the desired pulse, the whole cluster of pulses for a defined minimum to maximum period of time will be defined as a single pulse. This does introduce some instantaneous time/frequency error, however, the subordinate erroneous information the error can be made to cancel itself if appropriately averaged over a few brainwave cycles.

This averaging also serves another important function. Since brainwave patterns are a biological signal source they have a very erratic period to period frequency in any given time interval. Thus instantaneous period to period zero crossing to zero crossing frequency analyses produce discontinuous and often very erroneous information. Thus, any meaningful interpretation of dominant brainwave frequency must be average over a few cycles of the relevant waveform, as will be explained.

Referring now to FIG. 2, a specific circuit diagram of one form of hybrid frequency filter is shown in detail. Thus, the dominant frequency analyzer performs a three-step process. The first step is implemented by a series-connected capacitor $C_0$ which references the input signal about its own average level and then by transistors Q1 and Q2 which form a zero crossing detector such that Q1 or Q2 are respectively either on or off, depending upon whether the input signal is positive or negative. The filter 6 requires means for acknowledging the presence of the dominant one of the frequency pulses available and discriminating against erroneous pulses. Since all of these pulses can appear clustered in a short time period, only one of the pulses in this cluster should be recognized and the others should be inhibited or locked out. The digital frequency analyzer is therefore implemented by a modified monostable multivibrator which inhibits successive pulses, both positive and negative, from the zero crossing detector for a time period approximately equal to the reciprocal of $R_1C_1$ connected across active device transistors Q3 and Q4. The foregoing components taken together constitute means for establishing an inhibit time interval after each zero crossing which has a duration less than the periodicity interval being investigated and also serve to cotrol the ouptut of the detecting means so that the output is inhibited during that time and noise caused signals and other zero crossing effects not produced by the dominant frequency of interest are eliminated.

Thus, each time the output (the collector of Q4) of the digital frequency filter changes state, positive feedback through resistor R1 and capacitor C1 supplies base current to transistor Q3 to maintain the same output state for a period approximately equal to the reciprocal of R1, C1. During this interval the output of collector Q2 of the zero crossing detector may have changed state several times but the trigger current generated through R3 into the bace of Q3 is insignificant compared to the lock out current feed back through R1, C1. Thus, when a cluster of zero crossings is triggered into the base of transistor Q3, only one zero crossing will be recognized for the duration of the time period set by R1 C1.

More specifically the following criteria have proven useful for the EGG circuits of the present invention. The time contour R1, C1 is chosen such that only one pulse is passed per predetermined time period. This controls the high frequency uncertainty of zero crossings due to noise and subdominant wave forms. The combination of C2, Q5, C3 and R2 integrate and average over a period of about ½ second to average the dominant frequency over a few cycles and limit the output information to a rate which can be assimilated by the subject. The time constant of the combination C1, R1 is made about 40 milliseconds to discriminate against frequencies about 25 Hz, which frequencies are not of interest.

Means are provided for receiving the output of the digital frequency filter and for developing a voltage proportional to the frequency of the dominant zero crossings which have been detected. This means includes means for averaging the proportional voltage over a number of dominant zero crossing intervals. Thus, the digital pulse train becomes averaged over an appropriate time period which affords cancellation of errors introduced by the digital process frequency filter and produces a meaningful average of the biological signal over a long enough time period, as for example several cycles of the input signal. This average is converted to a voltage output proportional to the frequency of detected zero crossings; that is to say, the zero crossing pulses are converted from digital to analog form The averaging digital to analog convertor works as follows: With no digital signal input from junction resistor R1 capacitor C2 the junction of diode Q1 and capacitor C3 is at zero potential. When a digital pulse train arrives at the junction of resistor R1 and capacitor R2, the first positive going pulse forms a current through C2 which forward biases diode D1. The current then flows into the capicitor C3 causing the junction of capacitor C3, resistor R2 to jump in a positive direction. The amplitude of this jump is approximately equal to $$A \approx 30\ V_B\ C_2/C_3$$

Transistor Q5 is connected as an emitter follower to the junction of capacitor C3 and resistor R2. Its purpose is to provide the desired DC restoration current for capacitor C2 as the digital input swings negative on its return cycle. Resistor R2 acts to draw the junction of capacitor C3 and diode D1 back toward zero voltage but it returns toward zero only slightly before the next digital pulse forces it even higher in the positive direction. After a few cycles of input frequency the voltage at junction of capacitor C3 and resistor R2 steadily increases until the steady state voltage across resistor R2 settles at a point where the cycle to cycle current drawn out of capacitor C3 through resistor R2 exactly equals the cycle to cycle current pushed into capacitor C3 through capacitor C2 and diode D1. This output voltage is in direct proportion to the input frequency and has a linearity better than 1 percent. The frequency to voltage transfer equation is the following:

$$V_o \approx (f)\ (+V_B)\ C_2/R_2$$

where $V_o$ = the output voltage across resistor (R2)
$f$ = the digital input frequency
$+V_B$ = the battery supply voltage The value of capacitor C3 is selected to fulfill the desired time averaging function previously discussed.

For bio-feedback purposes the hybrid dominant frequency analyzer provides a brainwave frequency readout as a voltage directly proportional to the dominant frequency, which voltage may be directly used as analog information for frequency analysis, frequency information to subject feedback or other frequency-related control operations, as will be described.

Means is provided for producing wide band noise over a frequency range audible to the subject when converted to sound waves. Such means can exist of any of the known noise sources such as a Zener diode so arranged to generate a broad spectrum of white noise. The output of the noise source is applied to one input of a voltage control filter, 26, the control voltage to which is derived from the hybrid dominant frequency analyzer. The voltage control filter operates in such a way that as the brain wave frequency lowers the audio frequency band pass also lowers. Consequently a broad band audio frequency noise signal with spectral content proportional to the brain wave frequency is applied to one input of an analog amplitude modulator, 25. In this way the spectral content of the noise source is varied from a high range to a low range as the DC magnitude or voltage, i.e., the first analog signal at 32, varies between high and low values.

Means are provided for establishing upper and lower threshold values above which and below which the output signal is blanked. Such means consists of a pair of voltage comparators, 8 and 9, which effectively provide frequency discrimination which permits a restriction of the output to a specified frequency band of interest. Thus, a voltage supply, 12, sets a reference voltage across the frequency band pass controls, 10 and 11, which are made the variable resistance devices. A voltage reference established by the position of the upper frequency band pass control is supplied to a voltage comparator 8, while the same reference voltage is also applied to the lower frequency band pass control associated with comparator 9. Voltage comparator 8 is driven by the output signal from the hybrid dominant frequency analyzer and its polarization is so arranged that its output only exists when the output of the analyzer is below the references set by the limit control, 11. Likewise, the output of voltage comparator 9 is only available when the analyzer output level is above the reference level set by lower frequency band pass control 10. The outputs of the comparators 8 and 9 are applied to the input of an AND gate, 16, the output of which only exists if both inputs exist. Thus, if the analog voltage appearing at the output of the analyzer lies within the upper and lower frequency limits set by controls 10 and 11, the output of the AND gate 16 will exist due to both inputs existing. In this way, whenever the mamgnitude of the output of the analyzer is less than a predetermined upper limit and greater than a predetermined lower limit, a positive signal exists at the output of AND gate 16.

Means are provided for detecting the average strength of the bio-generated signal and for coverting the same into a second analog signal, the DC magnitude of which is proportional to the strength of the bio-generated signal. Such means consists of an amplitude envelope detector 15 the analog output of which is applied to one input of an analog switch 22. The output of detector 15 is a voltage the magnitude of which is directly proportional to the average strength of the biologically obtained signal.

Means is also provided for blanking of the audio output of the entire system whenever the second analog signal is less than a predetermined value. Such means includes an amplitude threshold control, 13, which in turn supplies a voltage reference to voltage comparator 14. Whenever the voltage comparator receives an output greater than the threshold value the output of comparator 14 will be placed in an "on" state; that is to say, whenever the brainwave amplitude is greater than the reference set by the amplitude threshold control 13. The digital outputs of both comparator 14 and AND gate 16 are applied to a second AND gate 17, which has a positive output whenever both inputs are simultaneously present. Thus, in order for gate 17 to have an output, both the amplitude must exceed a predetermined threshold and the frequency must lie within a predetermined range. The output of AND gate 17 is applied to the input of analog switch 22 and serves to actuate the same between open and closed positions whenever the previously mentioned simultaneous conditions occur. Upon actuation of the switch 22 into an "on" state the analog output from detector 15 is switched through and appears at the other input of amplitude modulator 25. The latter serves to vary the level of the noise output in proportion to the level of the signal received from detector 15. Thus, the output of modulator 25 when taken to an audio amplifier and suitable sound transducer, consists of a limited spectrum of noise within the audible perception range of the subject, which range is variable from higher to lower value in response to any variation appearing in the frequency of the input signal and is variable in amplitude in accordance with the strength of the input signal.

By way of summary the foregoing detailed disclosure and description illustrates one preferred embodiment of a biological feedback system constructed in accordance with the present invention. Of particualr significance should be pointed out such achievable features of the present invention, including an ability to obtain an 80 db rejection of the undesired dominant brainwave as little as one-half cycle beyond the band limits. Another feature is that the band limits are continuously adjustable over the full spectrum of frequencies of interest for brain wave analysis. By way of comparison feedback systems constructed from analog filters are inherently very difficult to implement in a continuously variable form, and furthermore do not possess such sharp rejection limits.

To those skilled in the art to which this invention pertains many modifications and changes will occur. For example, while the present invention is disclosed such that the frequency of the output noise signal is controlled by the analog frequency signal derived from the subject and the amplitude of the output noise signal is controlled by the amplitude of the signal from the subject, it is obvious that an interchange of these controls can be made, and in fact the output should be considered as a two-dimensional portrayal of the biological input signal from the subject. The selection of the particular control signal which matches the input will usually be made so that the most important aspect of the input signal is rendered most perceivable to the subject, and this may often result in an interchange of amplitude vs. frequency control signals with respect to the output.

In addition to the variations suggested above, it should be realized that the present invention incorporates several distinct aspects, certain of which are not required in the practice of others. For example, while the utilization of a noise output is believed more suitable for EEG feedback for human subjects it is possible to use variable frequency tone of low band width in connection with the hybrid frequency analyzer specifically set forth. It should also be pointed out that the two signal outputs from the analyzers of the present invention consist of variable voltages which may readily be used to control various of any useful indicator means, the majority of which are voltage responsive. Accordingly, the scope of the present invention should not be taken in a limiting sense based solely upon the specific disclosure made herein but should be taken in a broader sense, including such modifications as would suggest themselves to a person skilled in the art to which it pertains.

I claim:

1. In a bio-feedback device or system for processing a bio-generated signal produced by human or animal organism, means for generating an electrical signal in response to a bio-generated signal, means for detecting the dominant frequency of said electrical signal, means for discriminating against subdominant frequenices and noise contained in said signal, said means comprising means for establishing an inhibit time interval after each detection having a duration slightly less than but approaching the periodicity interval being investigated for controlling the output of said detecting means so that the output thereof is inhibited during said time interval, means for converting said detected dominant frequency to a signal the magnitude of which is proportional to said indicator means for creating a signal which varies between conditions perceptible to said organism, and means responsive to the magnitude of said analog signal for changing the indicated value of said indicator means.

2. A bio-feedback device as in claim 1 in which said means for converting the detected dominant frequency produces a voltage, the magnitude of which is linearly proportional to the time averaged dominant frequency thereof.

3. In a bio-feedback system for processing a bio-generated signal produced by a human or animal organism, means for generating an electrical signal in response to the bio-generated signal, means for detecting the dominant frequency of said electrical signal, means for developing an analog signal the DC magnitude of which is proportional to said dominant frequency, means for detecting the average strength of said bio-generated signal, means for converting the same into a second analog signal the DC magnitude of which is proportional to the strength of said bio-generated signal, means for producing noise signals over a frequency range audible to said human or animal organism when converted to sound waves, means responsive to the output off one of said analog signals for varying the spectral content of said noise signals from a high range to a low range as the DC magnitude of said one signal varies between high and low values, means responsive to the other of said analog signals for varying the strength of said noise signal in response thereto, and means for accepting said noise signal and for converting the same into sound waves.

4. A bio-feedback system as in claim 3 further including means for blanking the output signal whenever the magnitude of said first analog signal exceeds a first threshold value.

5. A bio-feedback system as in claim 3 further including means for blanking the output signal whenever the magnitude of said first analog signal is less than a predetermined value.

6. A bio-feedback system as in claim 3 further including means responsive to the second analog signal for blanking the same whenever said second analog signal is less than a predetermined value.

7. A bio-feedback system as in claim 3 further including visual indicator means for developing a perceptible reading indicative of the magnitude of said first analog signal.

8. A bio-feedback system as in claim 3 wherein said noise source includes means for generating a substantially wide band noise signal and wherein said means responsive to the output of said analog signal includes selection means selective for transmitting a limited and variable portion of the noise signal.

9. A bio-feedback system as in claim 3 in which said means for varying the spectral content of the output of said output noise signal is responsive to the strength of said first analog signal, and in which the means for varying the amplitude of the ouput of said noise signal is responsive to said second analog signal.

10. In a bio-feedback system for producing the bio-generated signal produced by a subject said bio-generated signal having a dominant frequency characteristic which is desired to detect in the presence of subdominant frequency and noise signals which it is desired to reject, a dominant frequency analyzer comprising means for receiving and generating an electrical signal in correspondence to said bio-generated signal, means for referencing said signal about a predetermined level so that said signal crosses said level in accordance with said periodicity to define a level crossing each occasion thereof, means for detecting said crossings of said signal and for developing a digital output signal for each detected level crossing, means for establishing an inhibit time interval after each level crossing having a duration slightly less than but approaching the periodicity interval being investigated and for controlling the output of said detecting means so that the output thereof is inhibited during said time interval, means for receiving said digital output signal and for developing a voltage proportional to the frequency of said zero crossing, said last named means including means for averaging said proportional voltage over a number of zero crossing intervals, indicator means responsive to said average proportional voltage for creating a signal which is perceptible to said organism.

11. A bio-feedback system as in claim 10 further including continuously variable voltage comparator means for comparing the analog output voltage of said analyzer with predetermined reference voltages and for blanking said output whenever its value is less than or greater than predetermined values thereof.

12. A bio-feedback system responsive to detectable signals generated by a subject that are representative of the biological state, said system comprising means connected to said subject for detecting said signals and for generating an electrical signal having the characteristics of said signals, amplitude detector means responsive to the detected signals for developing an amplitude voltage signal proportional to the amplitude thereof, pulse generator means responsive to the detected signals for generating a train of pulses having a pulse frequency proportional to the dominant frequency of the detected signal, coverter means responsive to the generated pulse train for producing a voltage signal proportional to the pulse frequency of the generated pulse train, voltage level sensing circuit means responsive to the pulse frequency proportional voltage signal for producing a frequency control signal whenever said frequency voltage signal lies within a predetermined range of values, comparator circuit means responsive to the amplitude signal for producing an amplitude control signal whenever said amplitude exceeds a predetermined value, gate means responsive to the frequency and amplitude control signals having an on state whenever both of said control signals are present, means responsive to said state of said gate for developing a subject perceptible feedback noise signal having a frequency content moveable in direct proportion to the frequency of said biological signal and an amplitude variable in direct proportion to variations in the average strength of said biological signal.

* * * * *